(12) United States Patent
Li et al.

(10) Patent No.: US 9,578,600 B2
(45) Date of Patent: Feb. 21, 2017

(54) METHOD AND APPARATUS FOR PROVIDING ADVANCED INDICATION FOR EPDCCH

(71) Applicant: Samsung Electronics Co., Ltd., Gyeonggi-do (KR)

(72) Inventors: Linbo Li, San Diego, CA (US); Jaber Borran, San Diego, CA (US); Yingqun Yu, San Diego, CA (US); Inyup Kang, San Diego, CA (US)

(73) Assignee: Samsung Electronics Co., Ltd (KR)

( * ) Notice: Subject to any disclaimer, the term of this patent is extended or adjusted under 35 U.S.C. 154(b) by 126 days.

(21) Appl. No.: 14/564,733

(22) Filed: Dec. 9, 2014

(65) Prior Publication Data
US 2015/0230173 A1 Aug. 13, 2015

Related U.S. Application Data

(60) Provisional application No. 61/939,594, filed on Feb. 13, 2014.

(51) Int. Cl.
*H04W 52/02* (2009.01)
*H04W 72/04* (2009.01)

(52) U.S. Cl.
CPC ..... *H04W 52/0212* (2013.01); *H04W 52/0229* (2013.01); *H04W 72/042* (2013.01)

(58) Field of Classification Search
None
See application file for complete search history.

(56) References Cited

U.S. PATENT DOCUMENTS

| 8,369,280 | B2 | 2/2013 | Dinan |
| 8,699,449 | B2 | 4/2014 | Dinan |
| 9,001,798 | B2* | 4/2015 | Papasakellariou H04W 72/0406 370/336 |
| 2012/0322486 | A1 | 12/2012 | Kameno et al. |
| 2013/0114528 | A1 | 5/2013 | Chen et al. |
| 2013/0194931 | A1 | 8/2013 | Lee et al. |
| 2013/0215842 | A1* | 8/2013 | Han .................... H04W 72/042 370/329 |
| 2013/0235821 | A1 | 9/2013 | Chen et al. |
| 2013/0272170 | A1 | 10/2013 | Chatterjee et al. |
| 2013/0301490 | A1 | 11/2013 | He et al. |

(Continued)

OTHER PUBLICATIONS

U.S. Appl. No. 61/859,119, "Method and Apparatus for Providing Advanced Indication for ePDCCH", filed Jul. 26, 2013.*

(Continued)

*Primary Examiner* — Christopher Crutchfield
*Assistant Examiner* — Thinh Tran
(74) *Attorney, Agent, or Firm* — The Farrell Law Firm, P.C.

(57) ABSTRACT

A method and an apparatus are provided for determining whether an enhanced physical downlink control channel (ePDCCH) transmission exists for a user equipment (UE) in a subframe. The UE receives a transmission on physical downlink control channel (PDCCH) resources of the subframe. Downlink control information (DCI) is extracted from the PDCCH resources. The DCI includes at least one bit indicating whether the ePDCCH transmission exists for the UE in the subframe. The UE determines whether the ePDCCH transmission exists using the at least one bit. Additional symbols of the subframe are buffered and decoded when the ePDCCH transmission exists.

16 Claims, 3 Drawing Sheets

(56) References Cited

U.S. PATENT DOCUMENTS

| | | |
|---|---|---|
| 2013/0308568 A1 | 11/2013 | Chen et al. |
| 2014/0036806 A1 | 2/2014 | Chen et al. |
| 2014/0064214 A1 | 3/2014 | Papasakellariou et al. |
| 2014/0092836 A1 | 4/2014 | Park et al. |
| 2014/0098761 A1 | 4/2014 | Lee et al. |
| 2014/0133395 A1 | 5/2014 | Nam et al. |
| 2014/0301359 A1* | 10/2014 | Seo ............. H04L 5/0007 370/330 |
| 2015/0029953 A1* | 1/2015 | Chen ............ H04W 72/042 370/329 |
| 2015/0245322 A1* | 8/2015 | Shimezawa ..... H04L 5/0053 370/329 |

OTHER PUBLICATIONS

Bhat, Prakash et al., LTE-Advanced: An Operator Perspective, LTE Advanced and 4G Wireless Communications, IEEE Communications Magazine, Feb. 2012, pp. 104-114.

David Gonzales G et al., Intercell Interference . . . , ICWMC 2013: The Ninth International Conference on Wireless and Mobile Communications, Copyright IARIA 2013, pp. 200-208.

3GPP TS 36.212 version 11.0.0 Release 11, LTE; Evolved Universal Terrestrial Radio Access (E-UTRA); Multiplexing and channel coding, 2012-10, pp. 81.

3GPP TS 36.331 version 11.1.0 Release 11, LTE; Evolved Universal Terrestrial Radio Access (E-UTRA); Radio Resource Control (RRC); Protocol specification, Nov. 2012, pp. 329.

\* cited by examiner

METHOD AND APPARATUS FOR PROVIDING ADVANCED INDICATION FOR EPDCCH

PRIORITY

This application claims priority under 35 U.S.C. §119(e) to a provisional application filed in the United States Patent and Trademark Office on Feb. 13, 2014, and assigned Ser. No. 61/939,594, the content of which is incorporated herein by reference.

BACKGROUND OF THE INVENTION

1. Field of the Invention

The present invention relates generally to enhanced physical downlink control channel (ePDCCH) transmission, and more particularly, to a method and an apparatus for providing advanced notification of ePDCCH transmission for a user equipment (UE).

2. Description of the Related Art

In the 3$^{rd}$ Generation Partnership Project (3GPP) Long Term Evolution (LTE) standard, a physical downlink shared channel (PDSCH) carries all user data signaling messages and a physical downlink control channel (PDCCH) carries layer one downlink control information (DCI). PDCCH is transmitted in a downlink control region and is allocated within a number of orthogonal frequency division multiplexing (OFDM) symbols at the beginning of each subframe. This allocation allows a UE to decode the PDCCH first and determine its potential assignments early, without having to read and buffer the entire subframe. Therefore, the UE can ignore the remaining portions of the subframe when the UE determines that no downlink assignment exists for that UE in the PDSCH region of the subframe. This mechanism has the potential to save power and extend battery life of the UE.

In order to increase the capacity of control channels to accommodate more complicated features, the concept of ePDCCH has been introduced. FIG. 1 is a diagram illustrating the incorporation of ePDCCH into a subframe. Specifically, ePDCCH regions 102 are disposed between PDSCH regions 104 in frequency, and after a PDCCH region 106 in time, within the subframe. As illustrated in FIG. 1, the ePDCCH regions 102 have a time range that begins after the PDCCH region 106 and lasts until the end of the subframe. Thus, if an ePDCCH transmission to the UE is allowed on the subframe, the UE is required to buffer the entire subframe, and then attempt to decode an ePDCCH transmission targeted to the UE. If the UE successfully decodes DCI in the PDCCH that corresponds to a downlink assignment for the UE, the UE also attempts to the decode the corresponding PDSCH transmission.

The battery life of the UE is negatively affected when the receiver of the UE remains active for an entire subframe and when the UE reads and buffers the entire subframe for all subframes on which an ePDCCH transmission for the UE is allowed.

SUMMARY OF THE INVENTION

The present invention has been made to address at least the above problems and/or disadvantages and to provide at least the advantages described below. Accordingly, an aspect of the present invention is to determine existence of an ePDCCH transmission targeted to the UE without waiting until the end of a corresponding subframe.

Another aspect of the present invention is to allow the UE to ignore remaining OFDM symbols of a subframe and save power when there is no PDSCH or ePDCCH transmission for the UE on the subframe.

According to an aspect of the present invention, a method is provided for determining whether an ePDCCH transmission exists for a UE in a subframe. The UE receives a transmission on PDCCH resources of the subframe. DCI is extracted from the PDCCH resources. The DCI includes at least one bit indicating whether the ePDCCH transmission exists for the UE in the subframe. The UE determines whether the ePDCCH transmission exists using the at least one bit. Additional symbols of the subframe are buffered and decoded when the ePDCCH transmission exists.

According to another aspect of the present invention, an apparatus is provided for determining whether an ePDCCH transmission exists for a UE in a subframe. The apparatus includes a memory, and a receiver configured to receive a transmission on PDCCH resources of the subframe. The apparatus also includes at least one processor coupled to the memory and the transmitter and configured to extract DCI from the PDCCH resources. The DCI includes at least one bit indicating whether the ePDCCH transmission exists for the UE in the subframe. The at least one processor is also configured to determine whether the ePDCCH transmission exists using the at least one bit. The at least one processor is further configured to decode additional symbols of the subframe when the ePDCCH transmission exists.

According to another aspect of the present invention, a device is provided for determining whether an ePDCCH transmission exists for a UE in a subframe. The device includes a memory and at least one processor coupled to the memory. The processor is configured to extract DCI from the PDCCH resources, the DCI comprising at least one bit indicating whether the ePDCCH transmission exists for the UE in the subframe, determine whether the ePDCCH transmission exists using the at least one bit, and buffer and decode additional symbols of the subframe when the ePDCCH transmission exists.

According to another aspect of the present invention, an article of manufacture is provided for determining whether an ePDCCH transmission exists for a UE in a subframe. The article of manufacture includes a machine readable medium containing one or more programs, which when executed implement the steps of: receiving a transmission on PDCCH resources of the subframe; extracting DCI from the PDCCH resources, the DCI including at least one bit indicating whether the ePDCCH transmission exists for the UE in the subframe; determining whether the ePDCCH transmission exists using the at least one bit; and buffering and decoding additional symbols of the subframe when the ePDCCH transmission exists.

BRIEF DESCRIPTION OF THE DRAWINGS

The above and other aspects, features, and advantages of the present invention will be more apparent from the following detailed description when taken in conjunction with the accompanying drawings, in which.

DETAILED DESCRIPTION OF EMBODIMENTS OF THE PRESENT INVENTION

Figure 1:
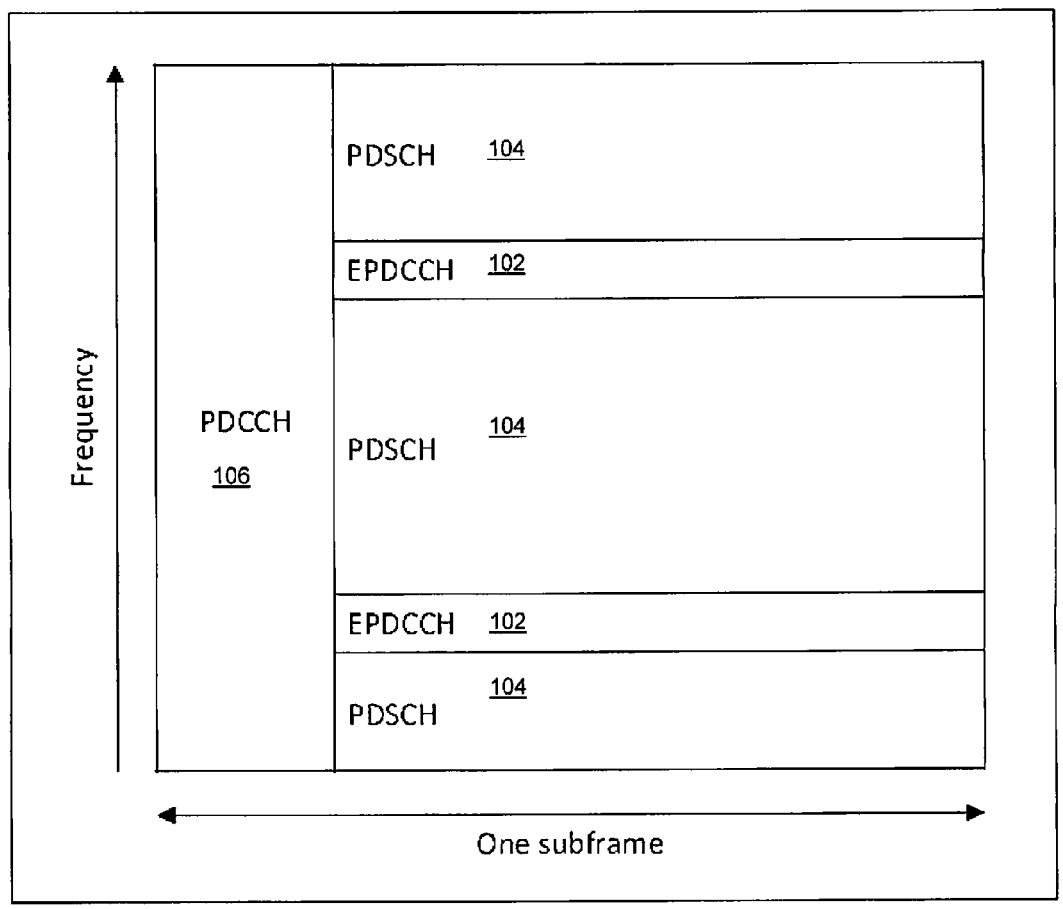
FIG. 1 is a diagram illustrating the incorporation of ePDCCH into a subframe.

Embodiments of the present invention are described in detail with reference to the accompany drawings. The same or similar components may be designated by the same or similar reference numerals although they are illustrated in different drawings. Detailed descriptions of constructions or processes known in the art may be omitted to avoid obscuring the subject matter of the present invention.

In accordance with an embodiment of the present invention, a new DCI format is defined that is transmitted on PDCCH resources and carries information, i.e., one or two bits, on the existence, i.e., presence or absence, of an ePDCCH transmission targeted to a UE on a subframe. Additionally, a new radio resource control (RRC) information element is defined to configure a required index and a radio network temporary identifier (RNTI) for the new DCI format.

Figure 2:
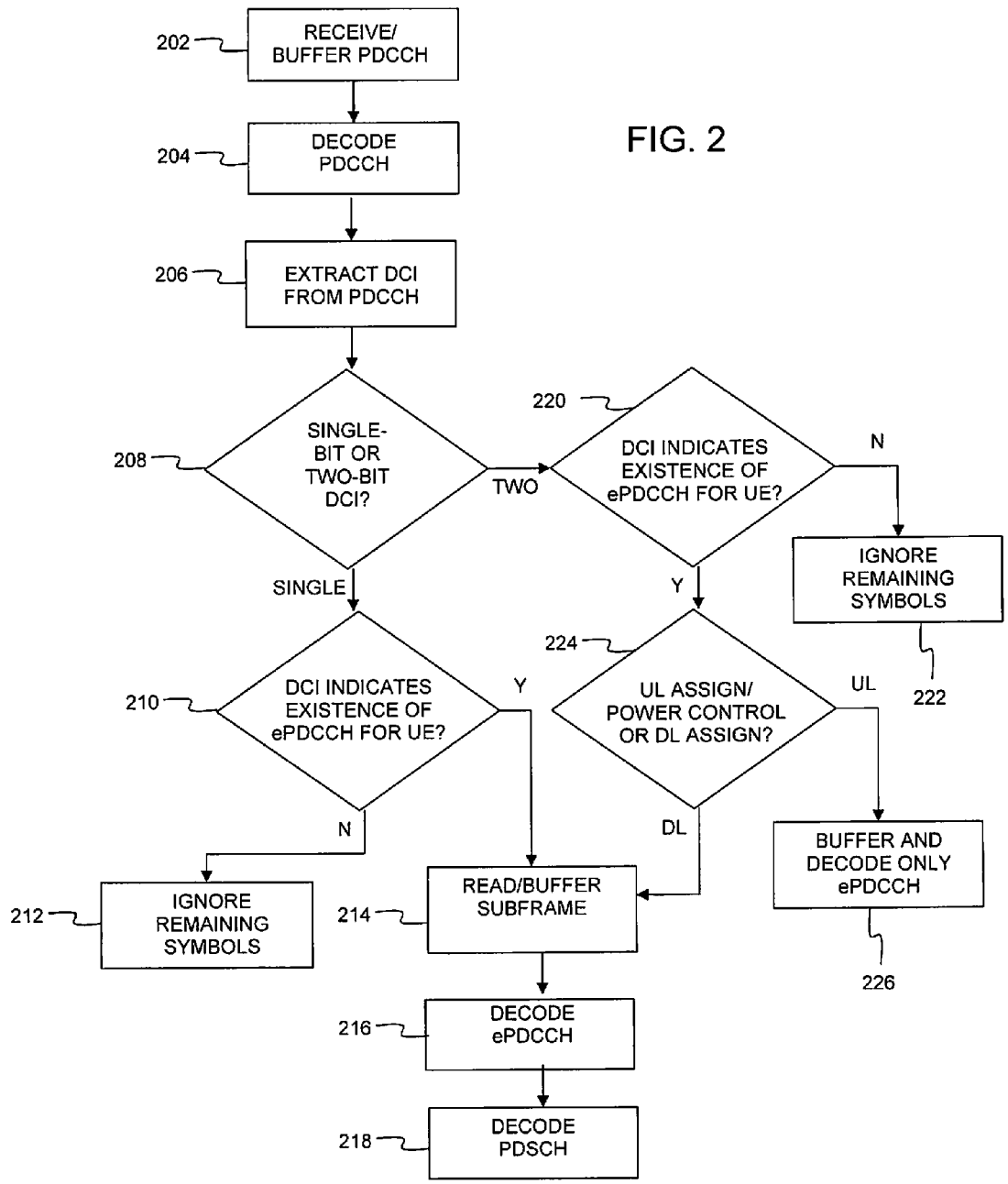
FIG. 2 is a flow-chart illustrating a method for decoding a subframe, according to an embodiment of the present invention.

Referring to FIG. 2, a flowchart illustrates a method for decoding a subframe, according to an embodiment of the present invention. In step 202, the UE receives PDCCH resources in a control region of the subframe, and the UE buffers the PDCCH resources. In step 204, the UE decodes the PDCCH resources. In step 206, the UE extracts DCI from the PDCCH resources. The DCI provides an indication on the existence of an ePDCCH transmission for the UE in the subframe. In step 208, the UE determines whether the DCI includes a single-bit indication or a two-bit indication.

When the DCI includes a single-bit indication, the UE uses the single-bit indication to determine the existence of an ePDCCH transmission for the UE in the subframe, in step 210, as set forth in Table 1 below.

TABLE 1

| Single-bit indication for a given UE | Meaning |
|---|---|
| 0 | There is no ePDCCH transmission to that UE on this subframe |
| 1 | There is an ePDCCH transmission to that UE on this subframe |

As shown above, a '0' single-bit indication indicates that there is no ePDCCH transmission for the UE on the subframe, while a '1' single-bit indication indicates that there is an ePDCCH transmission for the UE on the subframe.

When it is determined that there is no ePDCCH transmission for the UE on the subframe, i.e., the single-bit indication is '0', the UE ignores the remaining OFDM symbols of the subframe, in step 212. When the UE is able to ignore the remaining OFDM symbols, the UE is also able to conserve power and battery life. Step 212 assumes that there is not a PDSCH transmission for the UE scheduled through regular PDCCH practices. Should there be a PDSCH transmission scheduled through regular PDCCH practices, the UE would proceed with buffering and decoding of the corresponding PDSCH, as known in the art.

When it is determined that there is an ePDCCH transmission to the UE on the subframe, i.e., the single-bit indication is '1', the UE reads and buffers the subframe, in step 214. The UE then decodes the ePDCCH transmission targeted to the UE, in step 216. If there is a downlink assignment for the UE, the UE decodes any PDSCH determined for the UE, in step 218.

When the new DCI format carries a two-bit indication that indicates the existence of an ePDCCH transmission, the two-bit indication is used to determine the existence of an ePDCCH transmission for the UE in the subframe, in step 220. The two-bit indication allows the UE to further optimize its behavior based on the type of assignment or command carried on the ePDCCH. The two-bit indication provides the information set forth below in Table 2.

TABLE 2

| Two-bit indication for a given UE | Meaning |
|---|---|
| 00 | There is no ePDCCH transmission to that UE on this subframe |
| 01 | There is an ePDCCH transmission to that UE on this subframe carrying uplink (PUSCH) assignment or power control information |
| 10 | There is an ePDCCH transmission to that UE on this subframe carrying downlink (PDSCH) assignment |
| 11 | Reserved |

As shown above, when the two-bit indication indicates that an ePDCCH transmission does not exist through a '00' indication, the UE ignores the remaining OFDM symbols of the subframe, in step 222. When the UE is able to ignore the remaining OFDM symbols, the UE is also able to conserve power and battery life. Step 222 assumes that there is not a PDSCH transmission for the UE scheduled through regular PDCCH practices. Should there be a PDSCH transmission scheduled through regular PDCCH practices, the UE would proceed with buffering and decoding of the corresponding PDSCH, as known in the art.

When the two-bit indication indicates the existence of an ePDCCH transmission through '01' or '10' two-bit indication, the UE determines whether the ePDCCH transmission carries a downlink (PDSCH) assignment or an uplink (PUSCH) assignment/power control information, in step 224.

When it is determined that the ePDCCH transmission carries an uplink assignment or power control information through a '01' two-bit indication, the UE reads, buffers, and decodes only the resources corresponding to its ePDCCH assignment, and ignores the remaining physical resource blocks (PRBs) in the subframe, in step 226. When the UE is able to ignore the remaining PRBs in the subframe, the UE is also able to conserve power and battery life. Step 226 assumes that there is not a PDSCH transmission for the UE scheduled through regular PDCCH practices. Should there be a PDSCH transmission scheduled through regular PDCCH practices, the UE would proceed with buffering and decoding of the corresponding PDSCH, as known in the art.

When it is determined that the ePDCCH transmission carries a downlink assignment through a '10' two-bit indication, the UE reads and buffers the subframe, in step 214. The UE then decodes the ePDCCH transmission targeted to the UE, in step 216. The UE decodes PDSCH transmission corresponding to the downlink assignment, in step 218.

According to an embodiment of the present invention, a new RRC information element is defined to configure a required index and RNTI for the new DCI format. Specifically, an ePDCCH-RNTI is configured to enable grouping of a number of UEs with ePDCCH assignment, and to transmit the one or two bit indicators to that group of UEs using a single instance of the new DCI format. The new DCI format carries an array of one or two bit indications for the configured group of UEs.

Additionally, according to an embodiment of the present invention, an index is configured for each UE to indicate the position of the indication corresponding to that UE in the array of one or two bit indications in the new DCI format transmitted using the ePDCCH-RNTI configured for the UE, as set forth below:

For 1-bit indication: $b_0, b_1, \ldots b_{N-1}$, where N is the number of UEs in the group ePDCCH assignment.

For 2-bit indication: $b_{0,0}, b_{0,1}, b_{1,0}, b_{1,1}, \ldots b_{N-1,0}, b_{N-1,1}$, where N is the number of UEs in the group ePDCCH assignment.

Figure 3:
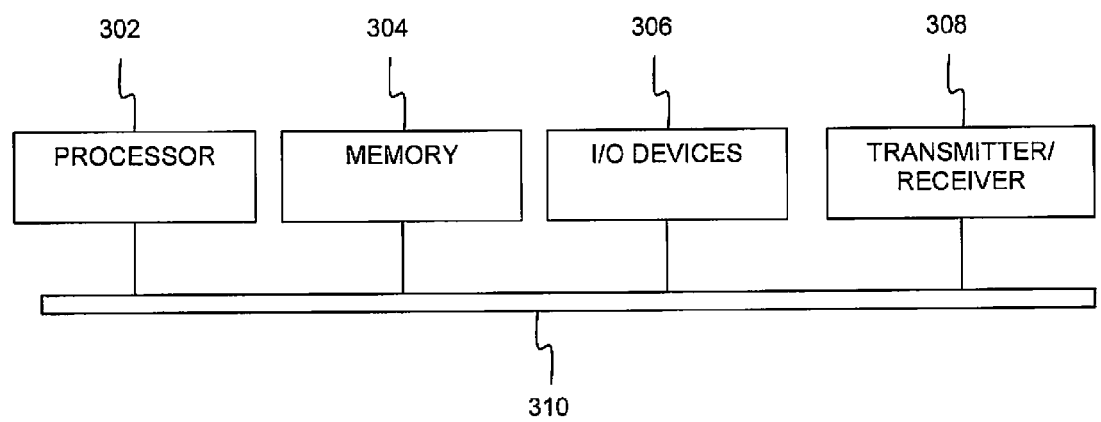
FIG. 3 is a block diagram illustrating an example of a hardware implementation of a computing system in accordance with which one or more methodologies of the present invention may be implemented.

Referring now FIG. 3, a block diagram illustrates an example of a hardware implementation of a system in accordance with which one or more methodologies of the present invention (e.g., the methodology described in the context of FIG. 2) may be implemented. Specifically, according to an embodiment of the present invention, the block diagram of FIG. 3 may relate to a UE in an OFDM system. The UE may be embodied as, for example, a personal media player (PMP), an MP3 player, a navigation device, a game player, a notebook, a netbook, an advertising panel, a TV, a digital broadcasting receiver, a personal digital assistant (PDA), a smart phone, a tablet personal computer (PC), as well as all kinds of mobile communication terminals which operate according to communication protocols corresponding to various communication systems, and application devices thereof. As shown, the system may be implemented in accordance with a processor 302, a memory 304, I/O devices 306, and a transmitter/receiver 308, coupled via a computer bus 310 or alternate connection arrangement.

It is to be appreciated that the term "processor" as used herein is intended to include any processing device, such as, for example, one that includes a central processing unit (CPU) and/or other processing circuitry. It is also to be understood that the term "processor" may refer to more than one processing device and that various elements associated with a processing device may be shared by other processing devices. The processor 302 may perform steps 204-226 of FIG. 2, described in detail above.

The term "memory" as used herein is intended to include a memory associated with a processor or CPU, such as, for example, random access memory (RAM), read only memory (ROM), a fixed memory device (e.g., hard drive), a removable memory device, flash memory, etc.

In addition, the phrase "I/O devices" as used herein is intended to include, for example, one or more input or output devices. Still further, the phrase "transmitter/receiver" as used herein is intended to include, for example, one or more transmitters and receivers to permit the computer system to communicate with another computer system or apparatus via an appropriate communications protocol. Accordingly, in an embodiment of the present invention, the UE is provided access to an OFDM system, and is able to transmit and receive OFDM signals over one or more channels. The transmitter/receiver 308 may perform step 202 of FIG. 2, described in detail above.

Software components including instructions or code for performing the methodologies described herein may be stored in one or more of the associated memory devices (e.g., ROM, fixed or removable memory) and, when ready to be utilized, loaded in part or in whole (e.g., into RAM) and executed by a CPU.

The present invention may be utilized in conjunction with the manufacture of integrated circuits. Regarding integrated circuits in general, a plurality of identical die are typically formed in a repeated pattern on a surface of a semiconductor wafer. Each die may include other structures or circuits. The individual die are cut or diced from the water, then packaged as an integrated circuit. One skilled in the art would know how to dice wafers and package die to provide integrated circuits. Integrated circuits so manufactured are considered part of this invention.

While the present invention has been shown and described with reference to certain embodiments thereof, it will be understood by those of ordinary skill in the art that various changes in form and detail may be made therein without departing from the spirit and scope of the invention as defined by the appended claims.

What is claimed is:

1. A method for determining whether an enhanced physical downlink control channel (ePDCCH) transmission exists for a user equipment (UE) in a subframe, the method comprising the steps of:
  receiving, at the UE, a transmission on physical downlink control channel (PDCCH) resources of the subframe;
  extracting downlink control information (DCI) from the PDCCH resources, the DCI comprising at least one bit indicating whether the ePDCCH transmission exists for the UE in the subframe;
  determining, at the UE, whether the ePDCCH transmission exists using the at least one bit; and
  buffering and decoding additional symbols of the subframe when the ePDCCH transmission exists,
  wherein the at least one bit comprises two bits indicating one of absence of the ePDCCH transmission for the UE, presence of the ePDCCH transmission carrying an uplink assignment or power control information for the UE, and presence of the ePDCCH transmission carrying a downlink assignment for the UE, and
  wherein, when the two bits indicate the presence of the ePDCCH transmission carrying the uplink assignment or power control information, buffering and decoding the additional symbols comprises:
  buffering and decoding only resources corresponding to the ePDCCH transmission for the UE; and
  ignoring remaining physical resource blocks (PRBs) of the subframe.

2. The method of claim 1, further comprising ignoring remaining symbols of the subframe when the ePDCCH transmission does not exist.

3. The method of claim 1, wherein the at least one bit comprises a single bit indicating one of presence and absence of the ePDCCH transmission for the UE in the subframe.

4. The method of claim 3, wherein, when the single bit indicates the presence of the ePDCCH transmission, buffering and decoding the additional symbols comprises:
  buffering a physical downlink shared channel (PDSCH) region of the subframe, the PDSCH region including the ePDCCH transmission for the UE; and
  decoding the ePDCCH transmission for the UE.

5. The method of claim 4, wherein buffering and decoding the additional symbols further comprises decoding a PDSCH transmission determined for the UE.

6. The method of claim 1, wherein, when the two bits indicate the presence of the ePDCCH transmission carrying the downlink assignment, buffering and decoding the additional symbols comprises:

buffering a PDSCH region of the subframe, the PDSCH region including the ePDCCH transmission for the UE;
decoding the ePDCCH transmission for the UE; and
decoding a PDSCH transmission in the PDSCH region corresponding to the downlink assignment.

7. The method of claim 1, wherein the DCI comprises an array of UE indices, each of the UE indices being assigned a respective at least one bit indicating whether a corresponding ePDCCH transmission exists for a given UE in the subframe.

8. An apparatus for determining whether an enhanced physical downlink control channel (ePDCCH) transmission exists for a user equipment (UE) in a subframe, the apparatus comprising:
a memory;
a receiver configured to receive a transmission on physical downlink control channel (PDCCH) resources of the subframe; and
at least one processor coupled to the memory and the receiver and configured to:
extract downlink control information (DCI) from the PDCCH resources, the DCI comprising at least one bit indicating whether the ePDCCH transmission exists for the UE in the subframe;
determine whether the ePDCCH transmission exists using the at least one bit; and
buffer and decode additional symbols of the subframe when the ePDCCH transmission exists,
wherein the at least one bit comprises two bits indicating one of absence of the ePDCCH transmission for the UE, presence of the ePDCCH transmission carrying an uplink assignment or power control information for the UE, and presence of the ePDCCH transmission carrying a downlink assignment for the UE, and
wherein, when the two bits indicate the presence of the ePDCCH transmission carrying the uplink assignment or power control information, the at least one processor is further configured to:
buffer and decode only resources corresponding to the ePDCCH transmission for the UE; and
ignore remaining physical resource blocks (PRBs) of the subframe.

9. The apparatus of claim 8, wherein the at least one processor is further configured to ignore remaining symbols of the subframe when the ePDCCH transmission does not exist.

10. The apparatus of claim 8, wherein the at least one bit comprises a single bit indicating one of presence and absence of the ePDCCH transmission for the UE in the subframe.

11. The apparatus of claim 10, wherein, when the single bit indicates the presence of the ePDCCH transmission, the at least one processor is further configured to:
buffer a physical downlink shared channel (PDSCH) region of the subframe, the PDSCH region including the ePDCCH transmission for the UE; and
decode the ePDCCH transmission for the UE.

12. The apparatus of claim 11, wherein the at least one processor is further configured to decode a PDSCH transmission determined for the UE.

13. The apparatus of claim 8, wherein, when the two bits indicate the presence of the ePDCCH transmission carrying the downlink assignment, the at least one processor is further configured to:
buffer a PDSCH region of the subframe, the PDSCH region including the ePDCCH transmission for the UE;
decode the ePDCCH transmission for the UE; and
decode a PDSCH transmission in the PDSCH region corresponding to the downlink assignment.

14. The apparatus of claim 8, wherein the DCI comprises an array of UE indices, each of the UE indices being assigned a respective at least one bit indicating whether a corresponding ePDCCH transmission exists for a given UE in the subframe.

15. A device for determining whether an enhanced physical downlink control channel (ePDCCH) transmission exists for a user equipment (UE) in a subframe, the device comprising:
a memory; and
at least one processor coupled to the memory and configured to:
extract downlink control information (DCI) from the PDCCH resources, the DCI comprising at least one bit indicating whether the ePDCCH transmission exists for the UE in the subframe;
determine whether the ePDCCH transmission exists using the at least one bit; and
buffer and decode additional symbols of the subframe when the ePDCCH transmission exists,
wherein the at least one bit comprises two bits indicating one of absence of the ePDCCH transmission for the UE, presence of the ePDCCH transmission carrying an unlink assignment or power control information for the UE, and presence of the ePDCCH transmission carrying a downlink assignment for the UE, and
wherein, when the two bits indicate the presence of the ePDCCH transmission carrying the uplink assignment or power control information, the at least one processor is further confirmed to:
buffer and decode only resources corresponding to the ePDCCH transmission for the UE; and
ignore remaining physical resource blocks (PRBs) of the subframe.

16. An article of manufacture for determining whether an enhanced physical downlink control channel (ePDCCH) transmission exists for a user equipment (UE) in a subframe, comprising a non-transitory computer readable storage medium containing one or more programs, which when executed implement the steps of:
receiving a transmission on physical downlink control channel (PDCCH) resources of the subframe;
extracting downlink control information (DCI) from the PDCCH resources, the DCI comprising at least one bit indicating whether the ePDCCH transmission exists for the UE in the subframe;
determining whether the ePDCCH transmission exists using the at least one bit; and
buffering and decoding additional symbols of the subframe when the ePDCCH transmission exists,
wherein the at least one bit comprises two bits indicating one of absence of the ePDCCH transmission for the UE, presence of the ePDCCH transmission carrying an uplink assignment or power control information for the UE, and presence of the ePDCCH transmission carrying a downlink assignment for the UE, and
wherein, when the two bits indicate the presence of the ePDCCH transmission carrying the uplink assignment or power control information, buffering and decoding the additional symbols comprises:
buffering and decoding only resources corresponding to the ePDCCH transmission for the UE; and ignoring remaining physical resource blocks (PRBs) of the subframe.

* * * * *